Figure 1:
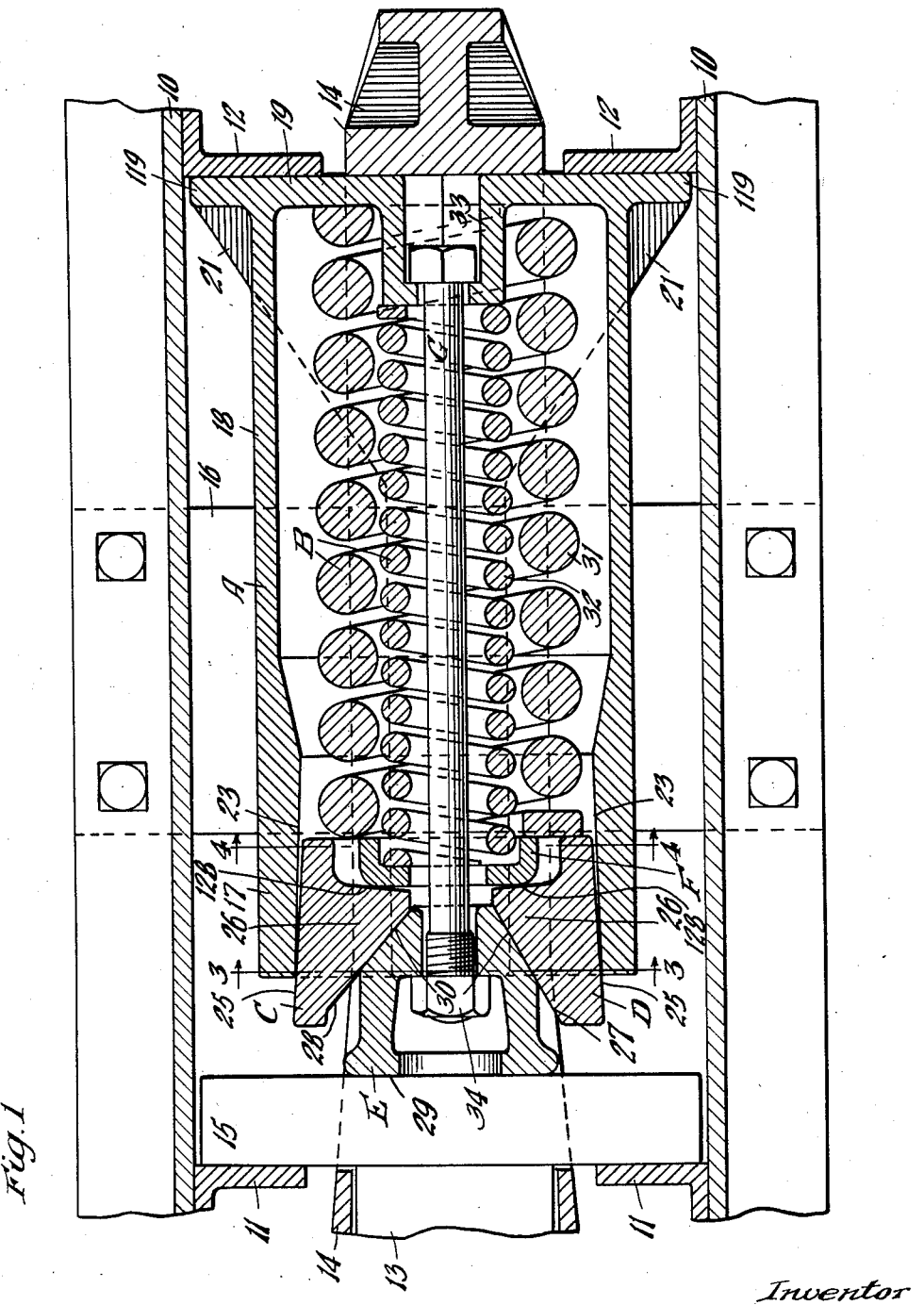

Nov. 4, 1930.  W. H. MINER  1,780,358
FRICTION SHOCK ABSORBING MECHANISM
Filed April 15, 1929  2 Sheets-Sheet 1

Witness
Wm. Geiger

Inventor
William H. Miner
By Joseph Harris
His Atty.

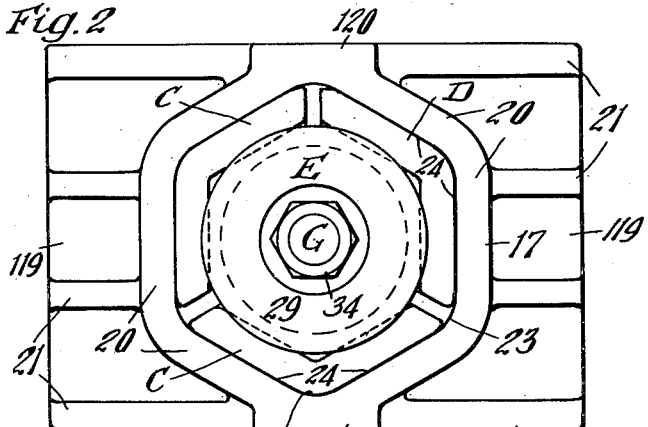
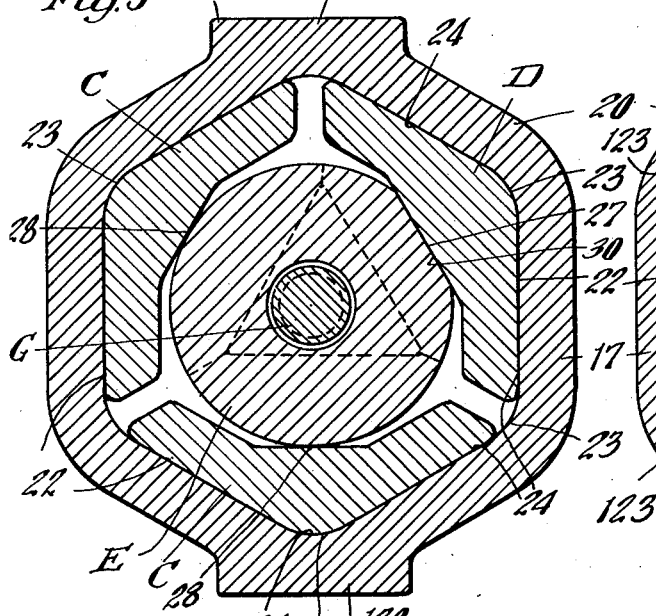
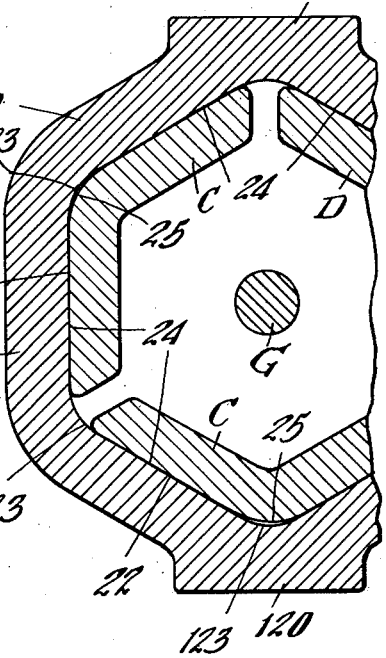
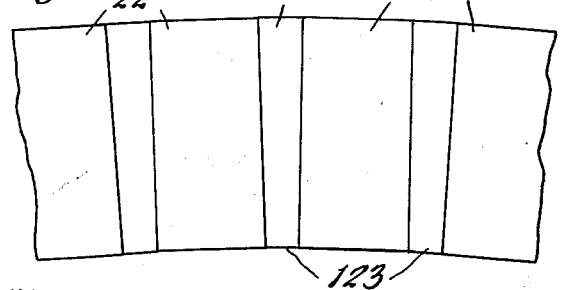

Patented Nov. 4, 1930

1,780,358

UNITED STATES PATENT OFFICE

WILLIAM H. MINER, OF CHAZY, NEW YORK, ASSIGNOR TO W. H. MINER, INC., OF CHICAGO, ILLINOIS, A CORPORATION OF DELAWARE

FRICTION SHOCK-ABSORBING MECHANISM

Application filed April 15, 1929. Serial No. 355,082.

This invention relates to improvements in friction shock absorbing mechanisms.

One object of the invention is to provide a friction shock absorbing mechanism of very high capacity, wherein is employed a friction shell, a plurality of wedge-actuated friction shoes and a spring resistance, the shell and shoes being so constructed that the cooperating longitudinally extending friction surfaces thereof positively guide the shoes individually, for movement in a direction lengthwise of the shell and positively prevent any circumferential displacement of the shoes with reference to the shell.

Another object of the invention is to provide a friction shock absorbing mechanism having a friction shell of polygonal cross section, cooperable friction shoes and a pressure-transmitting wedge so arranged that all the shoes will have an equalized radially outwardly directed wedge action against the shell to thereby insure uniform distribution of the stresses in the shell and to obtain maximum strength against bursting for a shell of given size and thickness of metal.

Another object of the invention is to provide a friction shock absorbing mechanism having a friction shell of polygonal cross section, such as a hexagon, and wedge-operated friction shoes cooperable therewith in such manner that each shoe has two angularly disposed flat faces coacting with two corresponding adjacent faces of the shell and wherein the shell friction surfaces are converged inwardly and so formed at the junctions of each pair of adjacent friction faces that true full surface contact is maintained between the shoes and shell throughout an entire compression stroke.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith, the section through the friction shoes and wedge being in two radial planes at an angle of 120°. Figure 2 is a front end elevation of the friction shock absorbing mechanism proper. Figure 3 is an enlarged vertical transverse section corresponding to the line 3—3 of Figure 1. Figure 4 is a broken, enlarged transverse sectional view corresponding to the line 4—4 of Figure 1. And Figure 5 is a lay-out of several of the interior friction faces of the shell.

In said drawings, 10—10 indicate the usual channel draft sills of a car underframe, to the inner faces of which are secured front stop lugs 11 and rear stop lugs 12, said lugs being of any well known or desired form. The butt end of a drawbar is indicated at 13, and associated therewith is a hooded cast yoke 14 of any desired form. The improved shock absorbing mechanism proper is disposed within the yoke, as is also a front follower 15. The yoke and parts therewithin are supported in operative position by a saddle plate 16, preferably bolted to the lower flanges of the draft sills.

In carrying out my invention, I provide, broadly, a combined friction shell and spring cage casting A; a spring resistance B; three wedge friction shoes C—C and D; a pressure-transmitting wedge E; a spring follower or cap F; and a retainer bolt G.

The combined shell and cage A comprises a friction shell proper 17 at the forward end thereof and a spring cage 18 rearwardly thereof. At its rear end, the casting A is formed with an integral rear wall 19 which is laterally extended, as indicated at 119, so that said rear wall functions as the rear follower of the draft gear in cooperation with the stop lugs 12. As shown in the drawings, the shell and casing are of hexagonal form, with uniform arrangement of each of the six sections 20, with one of the diagonals of the shell extending preferably vertically, as best indicated in Figure 2. The laterally extended sections 119 are braced and strengthened by a plurality of horizontally disposed, vertically separated ribs 21—21 which are tapered forwardly and merge with the hexagonal section of the casting. Furthermore, the cage casing is shown additionally strengthened along the top and bottom thereof as indicated at 120—120, the upper and lower faces, respectively, of said sections 120 being flat, so as to be better accommodated within the yoke and to provide a relatively wide bearing surface to cooperate with the yoke arms.

Referring more specifically to the shell section 17, the same is formed on its interior with six flat friction faces 22—22 symmetrically arranged with respect to the axis of the shell, each adjacent pair of said flat friction faces 22 being united by an intermediate, appreciably or pronounced curved section or face 23. Each adjacent pair of flat friction faces 22, with the intermediate curved face 23, together constitute what is hereinafter termed a friction surface and with which one of the friction shoes is adapted to cooperate. The three sets of friction surfaces above referred to converge inwardly of the shell so as to provide a slightly tapered interior. In this connection, special attention is called to the curved sections or faces 23 which are likewise converged inwardly of the shell and each of which is of varying radius. The maximum radius is at the outer end, as best indicated in Figure 3, the radius of the curve being gradually lessened inwardly of the shell, as shown in Figure 4 and indicated at 123. Referring to the lay-out of the flat friction faces and curved faces 23, this change in radius of each of the faces 23 is clearly indicated by the gradually downwardly tapered outlines. In actual practice, the difference between maximum and minimum radius of the curved faces 23 will be relatively small but sufficient for the purposes hereinafter described. In the drawings, this difference in curvature has been somewhat exaggerated in order to more clearly illustrate the construction.

The three friction shoes C—C and D are of similar form and differ only with respect to their wedge faces, as hereinafter pointed out. Each of said shoes is provided on its exterior with two flat friction faces 24—24 arranged at an angle to each other corresponding to the included angle between two of the flat faces of the hexagonal shell. The two flat friction faces 24 are united to an intermediate curved face 25, the latter being disposed opposite the shell curved face 23. The radius of the curved face 25 of each shoe is constant throughout the length of the shoe and corresponds to the maximum radius of the shell curved face 23 so that, as clearly indicated in Figures 1 and 3, there will be line contact between the curved faces 25 and 23 of each shoe and corresponding shell surface, whereas, inwardly of the outer end of the shell, the curved faces 25 of the shoes will be slightly spaced from or gradually relieved with respect to the curved faces 23 of the shell, as clearly indicated in Figure 4. On their inner sides, each shoe is provided with a wedge-shaped lateral enlargement 26, having an inwardly inclined wedge face 28, the two wedge faces of the shoes C—C being disposed at a blunter or more obtuse angle with respect to the axis than the face 27 of the shoe D. At the inner ends of the wedge enlargements 26, transverse shoulders 128 are formed, against which bears the spring follower or cap F.

The wedge E has an outer flat face 29 bearing against the follower 15 and through which the actuating pressure is transmitted, said flat face 29 preferably being rounded off on the edge as shown in Figure 1. Said wedge E is further provided with three inclined faces 30—30, two of which correspond in inclination to the wedge faces 28 of the two shoes C—C and the third of which corresponds in inclination to the face 27 of the shoe D. With this arrangement, as will be understood by those skilled in the art, a keen and effective wedge-acting angle is obtained between the wedge and shoe D, to thereby create high friction between the shoes and shell while at the same time, the blunt angle faces on the wedge E and shoes C—C, respectively, serve as positive releasing faces after the actuating pressure has been reduced.

The spring resistance B preferably comprises an outer heavy coil 31 and a nested inner lighter coil 32, the rear ends of which bear against the wall 19 of the casting A and a hollow boss 33, respectively.

At its forward end, the heavy coil 31 bears against the inner ends of the shoes and partially against the flange of the cup-shaped cap F and the inner lighter coil 32 is seated within and against the cap F, as clearly indicated in Figure 1.

The retainer bolt G extends through suitable openings in the boss 33, the spring cap F and the wedge E, the head of the bolt being seated within the boss 33 and the nut 34 being applied to the outer end of the bolt and disposed within the cored opening of the wedge E.

Two very important considerations in friction gears are the prevention of circumferential shift of the shoes and the maintenance of full area contact between the friction faces under all conditions of operation. With my improved construction, due to the angular arrangement of the flat friction faces of the shell and each shoe, respectively, a combined friction surface is formed, which absolutely prevents any circumferential shift of the shoes. In this connection, it will be noted also that the three shoe arrangement in conjunction with the three-faced wedge, insures equalized radially outwardly directed forces on the three shoes and also that each shoe, in effect, has a wedging action against the friction shell. This last mentioned wedging action of the shoes laterally against the shell further serves to positively insure uniform stresses in the shell, since it will be apparent that each diametrically opposite and parallel set of sections of the shell will be pressed apart and thus prevent distortion of the shell and any excessive stress in any particular section of the shell.

With reference to maintenance of the full area contact between the friction surfaces of the shoes and shell, it will be observed that this is maintained on the converged friction surfaces in any position of the shoes with respect to the shell. Due to the fact that, initially there is only line contact between the curved faces 23 and 25 at the outer ends of the former, as the shoes travel inwardly, the curved faces 25 thereof will gradually slightly space themselves from the shell curved surfaces 23 so that there is no possibility of the shoes being lifted off from the shell flat friction surfaces and hence there will always be full area contact between the two pairs of flat friction faces 22 and 24 of the shell and shoe respectively. During the inward movement of the shoes and due to the slight spacing initially occurring at the curved faces above mentioned, it is evident that there will be an equally distributed pressure radially outward against both flat sections of each shoe and this will remain true, notwithstanding the tapered or converged formation of the friction shell surfaces. In connection with the use of the faces 23 of pronounced or appreciable curvature, as clearly illustrated in the drawings (a curved surface of a maximum of 2″ radius and a minimum of 1⅜″ therefor having been found advantageous in actual service) it will be observed that, as the shoes are moved inwardly of the tapered shell, there is no danger of the edges of the shoes gouging into or abrading the shell surface at the corners, which, if not prevented, might start a line of scoring which would so weaken the shell that the outward pressures would soon fracture or disrupt the shell. Stated otherwise, while the edges of each pair of adjacent shoes approach each other during a compression stroke, due to the taper of the shell, the relieved surfaces at the corners between the edges of the shoes prevent the undesirable imbedding or scoring above mentioned, while permitting the maximum area of contact between the shoe and shell faces. Further, because of the curved faces 23 opposite the angles of the friction shoes, should there be any variations between the angularity of the flat faces of the shoes and shell, the opposed curved formations of the shell and shoes facilitate the relatively rapid seating of the shoes on the shell without danger of undesirable scoring or abrasion at the corners of the shell opposite the angles of the shoes and, after the mechanism has been compressed a few times, a perfect seating will be obtained and, in fact, a somewhat enlarged area of contact produced, due to the merging of the curved faces into the flat faces of both the shell and shoes.

In operation, assuming a buffing stroke, the follower 15 will move the pressure-transmitting wedge E inwardly of the shell and the wedge in turn will set up a wedging or spreading action against the shoes C—C and D. The latter in turn will travel lengthwise of the shell, being yieldingly resisted by the spring B. Due to the converging surfaces of the shell, the shoes C—C and D will be forced laterally toward each other a slight amount, that is, a differential action will be set up which will slightly accelerate the movement of the shoes. In a release action, collapse of the wedge shoe friction system is insured by reason of the blunt angle faces on the wedge and shoes C—C, which in turn permits all of the parts to be moved outwardly to normal position under the influence of the spring means B.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a combined friction shell and spring cage, the shell proper being of hexagonal cross section and presenting three interior sets of friction surfaces, said sets being inwardly converged and each set comprising two adjacent, angularly disposed flat faces and an intermediate curved face, the radius of the latter being greater at its outer end than at its inner end; of a spring resistance; wedge pressure-transmitting means; and three wedge friction shoes, each shoe having an outer friction surface comprised of two flat faces and an intermediate curved face, the radius of which is substantially constant throughout its length, whereby, as the shoes are moved inwardly of the shell on the tapered sets of friction surfaces thereof, full friction surface contact is maintained between the flat faces of the shoes and the flat faces of the shell.

2. In a friction gear, the combination with a friction shell of substantially hexagonal transverse cross section, said shell having six interior flat friction faces converging inwardly of the shell and symmetrically arranged with respect to the longitudinal axis of the shell, the adjacent longitudinal edges of each adjacent pair of said flat faces merging with an appreciably curved face to permit proper seating of and minimization of abrasion by cooperable friction shoes slidable thereon, whereby three friction surfaces symmetrically arranged with respect to the axis are provided, each comprising two adjacent flat faces with an intervening curved face with the longitudinal edges of adjacent friction surfaces separated by a curved face; a spring resistance; a friction shoe cooperable with each said friction surface, each shoe having two flat faces cooperable with the corresponding two flat faces of the shell friction surface and a curved face at the junction of the two shoe flat faces; and a centrally disposed wedge projecting outwardly of the shoes and having wedge engagement therewith, said wedge being adapted to directly receive the actuating pressure.

3. As an article of manufacture a friction gear shell of substantially hexagonal transverse cross section, said shell having six interior flat friction faces converging inwardly of the shell and symmetrically arranged with respect to the longitudinal axis of the shell, the adjacent longitudinal edges of each adjacent pair of said flat faces merging with a pronounced curved face to permit proper seating of and minimization of abrasion by cooperable friction shoes slidable thereon, whereby three friction surfaces symmetrically arranged with respect to the axis are provided, each comprising two adjacent flat faces with an intervening curved face with the longitudinal edges of adjacent friction surfaces separated by a curved face.

4. In a friction gear, the combination with a friction shell of substantially hexagonal transverse cross section, said shell having six interior flat friction faces converging inwardly of the shell and symmetrically arranged with respect to the longitudinal axis of the shell, the adjacent longitudinal edges of each adjacent pair of said flat faces merging with an appreciably curved face to permit proper seating of and minimization of abrasion by cooperable friction shoes slidable thereon whereby three friction surfaces symmetrically arranged with respect to the axis are provided, each comprising two adjacent flat faces with an intervening curved face with the longitudinal edges of adjacent friction surfaces separated by a curved face; a spring resistance; a friction shoe cooperable with each said friction surface, each shoe having two flat faces cooperable with the corresponding two flat faces of the shell friction surface, and a curved face at the junction of the two shoe flat faces; a wedge, said wedge and shoes having cooperating sets of engaging faces, certain of said faces being disposed at a keen wedge acting angle and others at a blunt releasing angle with respect to the longitudinal axis of the mechanism.

5. In a friction shock absorbing mechanism, the combination with a friction shell of substantially hexagonal transverse cross section and having three interior sets of friction surfaces, said sets being converged inwardly of the shell and symmetrically arranged with respect to the longitudinal axis, each said set comprising two adjacent flat faces and an intermediate curved face; of a spring resistance; wedge pressure transmitting means; and three friction shoes, each shoe having an outer friction surface comprised of two flat faces and an intermediate curved face, said curved faces of the shell and shoes being initially so formed as to provide for graduated relief therebetween lengthwise thereof.

In witness that I claim the foregoing I have hereunto subscribed my name this 29th day of March, 1929.

WILLIAM H. MINER.